United States Patent
Haenni et al.

(10) Patent No.: US 7,335,284 B2
(45) Date of Patent: Feb. 26, 2008

(54) MODULAR ELECTROCHEMICAL CELL

(75) Inventors: Werner Haenni, Peseux (CH); Cédric Faure, Cortaillod (CH); Philippe Rychen, Muespach-le-Haut (FR)

(73) Assignee: Adamant Technologies SA, La Chaux-de-Fonds (CH)

( * ) Notice: Subject to any disclaimer, the term of this patent is extended or adjusted under 35 U.S.C. 154(b) by 780 days.

(21) Appl. No.: 10/476,740

(22) PCT Filed: Apr. 22, 2002

(86) PCT No.: PCT/CH02/00221

§ 371 (c)(1),
(2), (4) Date: Nov. 3, 2003

(87) PCT Pub. No.: WO02/088430

PCT Pub. Date: Nov. 7, 2002

(65) Prior Publication Data

US 2004/0146779 A1    Jul. 29, 2004

(30) Foreign Application Priority Data

May 1, 2001    (EP)    ................... 01810430

(51) Int. Cl.
  *C25B 9/06*    (2006.01)
(52) U.S. Cl. ............... 204/257; 204/253; 204/267; 204/269; 204/278.5
(58) Field of Classification Search ........... 204/253, 204/257, 267, 269, 278.5
See application file for complete search history.

(56) References Cited

U.S. PATENT DOCUMENTS

| | | | | |
|---|---|---|---|---|
| 4,445,994 | A | 5/1984 | Divisek et al. | 204/258 |
| 5,041,202 | A * | 8/1991 | Friconneau et al. | 204/278.5 |
| 5,783,051 | A | 7/1998 | Hirai et al. | 204/254 |
| 5,795,450 | A | 8/1998 | Hirai et al. | 204/256 |
| 5,928,489 | A * | 7/1999 | Winnick | 205/618 |
| 6,235,186 | B1 | 5/2001 | Tanaka et al. | 205/521 |
| 6,306,270 | B1 | 10/2001 | Hänni et al. | 204/268 |
| 6,512,038 | B1 | 1/2003 | Ladouce et al. | 524/437 |
| 6,878,244 | B2 * | 4/2005 | Sioli | 204/258 |

FOREIGN PATENT DOCUMENTS

| | | |
|---|---|---|
| EP | 1031645 | 8/2000 |
| EP | 1031645 A1 | 8/2000 |
| EP | 1036861 | 9/2000 |
| FR | 2784386 | 4/2000 |
| WO | WO 00/22034 | 4/2000 |
| WO | WO 00/34184 | 6/2000 |

* cited by examiner

*Primary Examiner*—Bruce F. Bell
(74) *Attorney, Agent, or Firm*—Townsend M. Belser, Jr.; Nexsen Pruet, LLC

(57) ABSTRACT

A modular electrochemical cell having two interchangeable assemblies each with a support structure defining a cylindrical recess and having a fitting for connecting a pipe to the assembly. A disc-shaped electrode is arranged inside each recess and the assemblies are arranged relative to each other so that their respective electrodes face each other. A modular insert is inserted between the assemblies to define an open space between the electrodes and to distribute fluid to a plurality of openings spaced from each other along an edge of this open space. Securing members secure together the two assemblies and the modular insert, and passages in the support structures convey fluid between the fittings and the modular insert.

20 Claims, 6 Drawing Sheets

MODULAR ELECTROCHEMICAL CELL

BACKGROUND OF THE INVENTION

Field of the Invention

The present invention relates to electrochemical cells. It relates more particularly to a modular electrochemical cell which uses disc-shaped electrodes, advantageously made of diamond, both in monopolar and in bipolar mode, with electrode separations which can be adjusted at will and in the most diverse configurations making it possible, in particular, to operate on two or three different liquid streams.

BRIEF SUMMARY OF THE INVENTION

Thanks to its modularity, the cell according to the invention can thus be used in a very simple way both for research and development work and in pilot or industrial-scale plants.

This type of electrochemical cell finds a particularly advantageous application in the decontamination of waste water by oxidizing the contaminants it contains.

More specifically, the modular electrochemical cell according to the invention is characterized in that it comprises:

two roughly identical assemblies each comprising a support structure pierced with a cylindrical housing and with an opening passing through in its portion situated outside the said housing and able to be connected to a pipe for conveying or removing a fluid, and a disc-shaped electrode arranged inside each housing, the said support structures being arranged in such a way that their respective electrodes face each other, inserted between the said assemblies, insert means having, at least, the function of circulating and distributing the said fluid between the electrodes, and members for connecting the said assemblies and the said insert means together.

As a preference, the electrodes comprise a conducting substrate and a conducting layer of diamonds deposited on the substrate. Furthermore, each electrode is fixed on a conducting support disc which can be connected to a power source and whose axial position inside the housing is adjustable from the outside so as to lie flush with the outer face of the electrode and the edge of the support structure. In addition, the housing advantageously contains a ring surrounding the support disc and the axial position of which is adjustable from the outside so as to compress a seal between the electrode, the housing and the disc.

In a first type of configuration, the two support structures each have an opening which opens, towards the inside, via a groove in the shape of an arc of a circle, and are arranged in such a way that the said grooves are diametrically opposed, the opening of one support structure serving to convey fluid and the opening of the other serving to remove it.

According to one embodiment using this first configuration, the said insert means comprise an insulating washer pierced with orifices situated facing the said grooves, each of these orifices communicating with the internal portion of the washer via a radial duct.

According to another embodiment, the said insert means comprise:

an insulating flat spacer annulus pierced with orifices situated facing the said grooves, each of these orifices communicating with the internal portion of the annulus via a radial duct, and two insulating washers arranged one on each side of the annulus and each pierced with a slot in the shape of an arc of a circle situated facing one of the grooves.

According to yet another embodiment, the said insert means comprise:

an insulating flat annulus pierced with two slots in the shape of arcs of a circle situated facing the said grooves, a disc-shaped bipolar electrode arranged inside the said annulus, and two insulating washers arranged one on each side of the annulus and each pierced with orifices situated facing one of the grooves, each of these orifices communicating with the internal portion of the washer via a radial duct.

In a second type of configuration, the support structures each have two openings which emerge, inwards, via two diametrically opposed grooves, in the form of arcs of a circle, the said support structures being arranged in such a way that their respective grooves face each other, the openings of each support structure being used one for conveying and the other for removing a fluid.

According to an embodiment using this second configuration, the said insert means comprise:

a selectively permeable conducting membrane of the ion exchanger type or a porous diaphragm, and two insulating washers arranged one on each side of the membrane or of the diaphragm and each pierced with orifices situated facing the said grooves, each of these orifices communicating with the internal portion of the washer via a radial duct.

According to another embodiment, the said insert means comprise:

a central hollow annulus which can be connected to a pipe for conveying and to a pipe for removing fluid, two insulating washers arranged one on each side of the annulus, two selectively permeable conducting membranes of the ion exchanger type or two porous diaphragms arranged respectively on the other side of these two washers, and two insulating washers arranged respectively on the other side of the two membranes or diaphragms and each pierced with orifices lying facing the said grooves, each of these orifices communicating with the internal portion of the washer via a radial duct.

BRIEF DESCRIPTION OF THE SEVERAL VIEWS OF THE DRAWINGS

Other features of the invention will become apparent from the description which will follow, given with reference to the attached drawing in which.

DETAILED DESCRIPTION OF THE INVENTION

Figure 1:
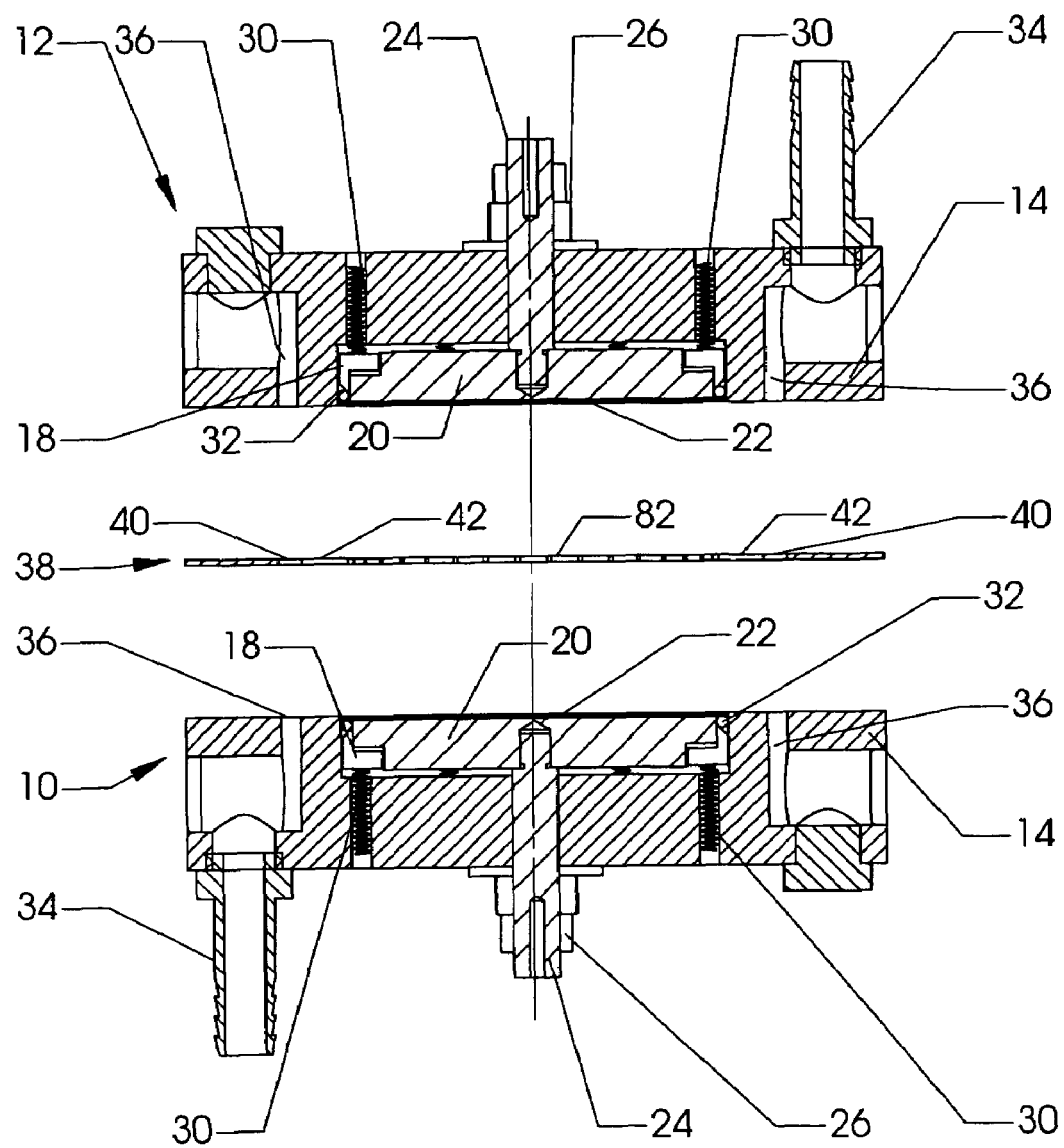
FIGS. 1 and 2 depict, in axial section an exploded perspective view, respectively, a first embodiment of a monopolar cell.

It will be noted that, in this description, the elements common to the various embodiments of the invention are denoted by the same reference numerals.

In FIGS. 1 and 2, 10 and 12 have been used to represent two identical assemblies. Each has, as its basis, a support structure 14, made of polypropylene, which has the shape of a disc exhibiting two diametrically opposed truncated portions 16 to form two flat faces giving the device a stable base.

The cage 14 is pierced with a central cylindrical housing in which there sits a mobile ring with an L-shaped cross section, 18, made of aluminum or plastic and receiving, also such that it can move, a disc 20 made of copper or of nickel.

The outer face of the disc 20 has, soldered or bonded to it using a silver-based paste, an electrode 22 formed of a substrate which may, for example, be made of silicon, silicon carbide, titanium or zirconium, coated on its outer face with a layer of doped diamond to make it electrically conductive. This electrode may advantageously be produced using the technique described in document FR 99 02483.

The inner face of the disc 20 is fixed to the end of a central screw 24 passing through a tapped hole formed in the end of the cage 14 and the other end of which takes a lock nut 26.

The end of the cage 14 is pierced with six tapped holes distributed uniformly around its periphery, receiving a screw 28 that can be actuated from the outside to act on the ring 18 via a coil spring 30.

It will be noted that the edge of the ring 18 facing the electrode 22 has a face that is chamfered on the outside and acts on an O-ring seal 32 trapped between the electrode, the wall of the housing and the disc.

Finally, the cage 14 is pierced on its edge, outside of the perimeter occupied by the electrode, with a tapped hole into which there is screwed a fitting 34 intended for the connection of a hose, not depicted. This fitting opens, on the inside, into a groove 36 in the shape of an arc of a circle subtending about 90°, with the same axis as the assembly. The figures in actual fact show two diametrically opposed grooves 36 because, in a configuration described later on, the cell according to the invention needs these.

The cell also comprises, between the two assemblies 10 and 12, a supply washer 38 which is made of an elastomer such as, for example, one of the products marketed under the names of Viton and EPDM. This washer has an external contour corresponding to that of the cages 14 and a circular internal contour with the same diameter as the electrodes 22.

The washer 38 is pierced with circular orifices 40 of the diameter corresponding to the thickness of the groove 36 and forming a belt with the same radius as this groove. The orifices 40 thus lie facing the groove 36. Each of these orifices communicates with the internal portion of the washer 38 via a radial duct 42.

The figures show that the orifices 40 cover the entire periphery of the washer 38 even though only those lying facing the groove 36 are of use. This arrangement, however, has the advantage of making the washer perfectly homogeneous. Of course, it would be possible to settle for a series of orifices 40 only facing the groove.

Figure 2:
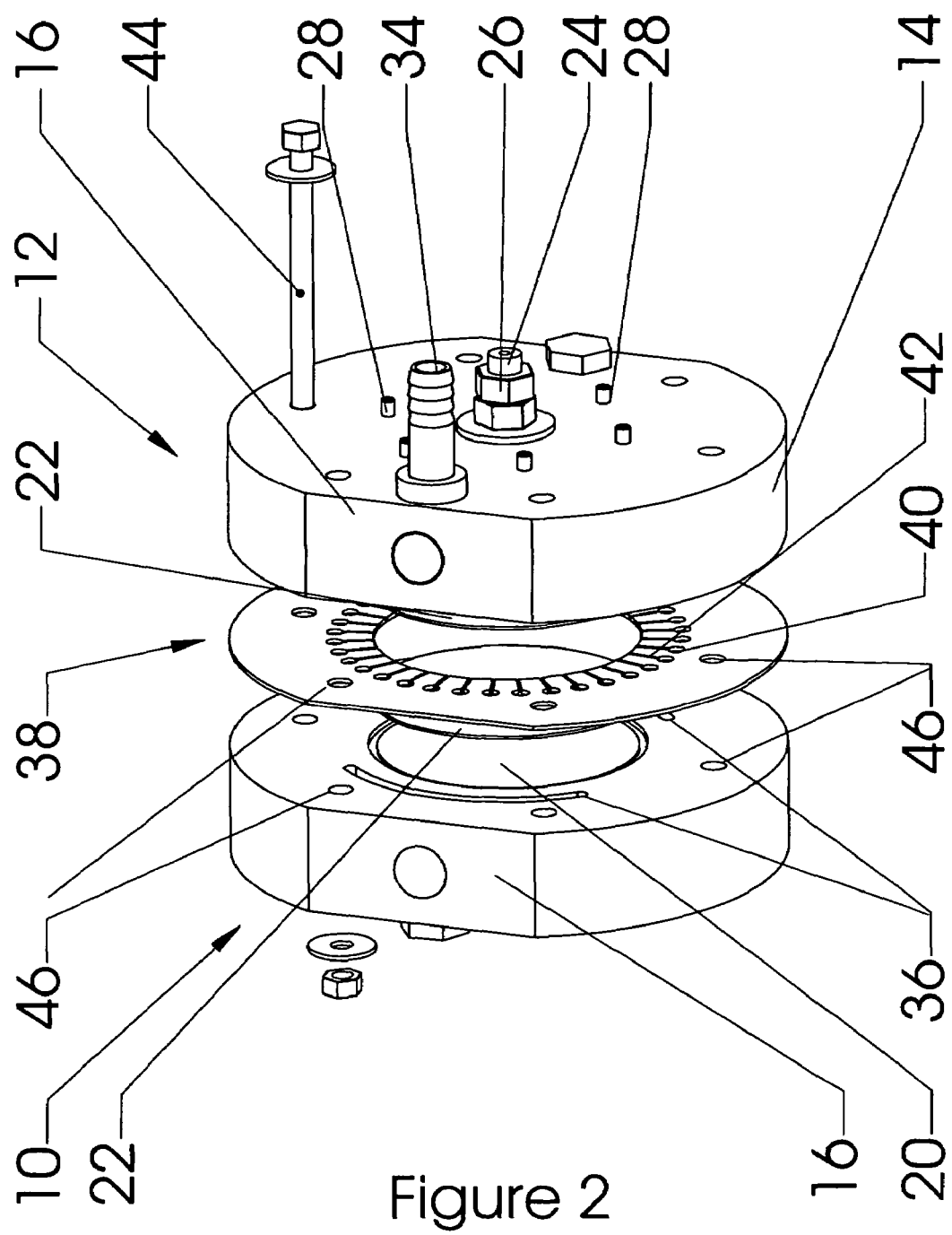

The two assemblies 10 and 12, with the washer 38 inserted between them and the fittings 34 arranged diametrically opposed, are assembled using six bolts and nuts distributed around the periphery of the cell. In order not to clutter the drawing, FIG. 2 depicts only the heads 44 of these bolts and the holes 46 made in cages 14 and the washer 38 that allows them to pass.

Before the cell which has just been described is assembled, it is necessary, for each of the assemblies 10 and 12, to bring the outer face of the electrode 22 flush with the inner face of the cage 14. This is done by action on the screw 24 and then, once the two items are flush with each other, by locking it using the nut 26. When assembly has been performed, using the six nuts and bolts, the six screws 28, with the aid of the springs 30, serve to compress the seal 32 against the electrode 22.

In operation, the screws 24 are respectively connected to the terminals of an appropriate power source, while piping for conveying and removing liquid is connected respectively to the fittings 34. The liquid introduced into the cell via one of the fittings is typically a contaminated waste water. The electrolysis process performed in the cell will allow purified water to appear on the other fitting, accompanied by gas resulting from the reaction that has taken place.

Thanks to the structure of the cell, the liquid introduced under pressure for example in the bottom of the left-hand assembly 10, opens into the lower groove 36 then into the orifices 40 of the washer 38 which lie facing it, before being injected into the space between the two electrodes 22 via the radial ducts 42 associated with the orifices 40. The liquid is subjected, in this space, to the electrolysis process and is then introduced, at the top of the right-hand assembly 12, into the upper groove 36 through the ducts 42 and the corresponding orifices 40 before being removed to the outside.

To set a concrete example, and purely by way of illustration, the electrodes 22 have a diameter of the order of 10 cm and a thickness of between 0.5 and 3 mm, while the disc 20 has a thickness of 10 to 12 mm. The thickness of the washer 38 is also between 0.5 and 3 mm.

Figure 3:
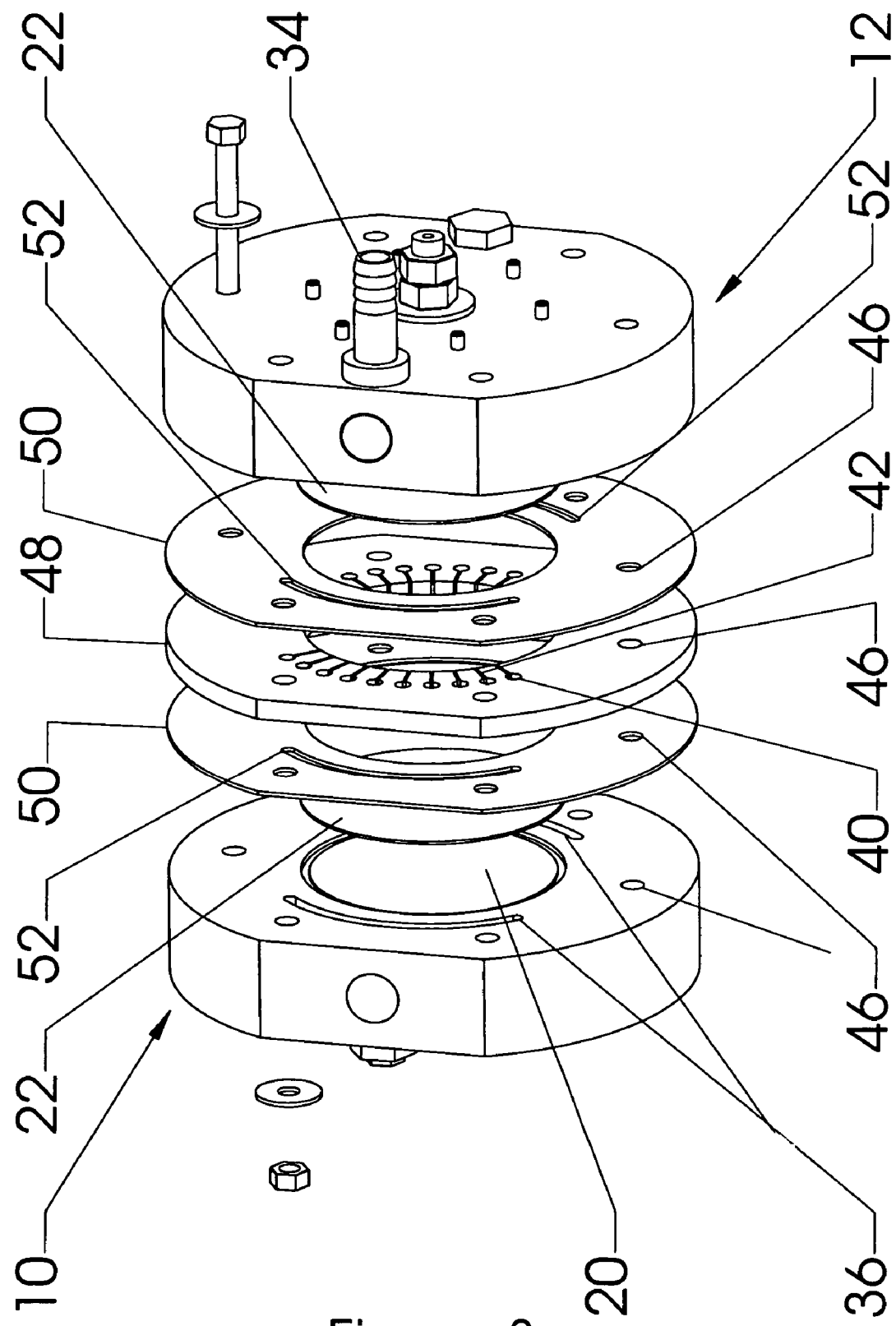
FIG. 3 depicts, in exploded perspective, a second embodiment of a monopolar cell with very well separated electrodes.

The cell that has just been described is suitable for fluids with relatively low conductivity. When working with electrolytes that have a high conductivity, typically in excess of 3-5 mS/cm, it is necessary to increase the separation of the two electrodes. In this case, which is the second embodiment of the cell according to the invention, the supply washer 38 is replaced, as shown in FIG. 3, by a spacer annulus 48, made of polypropylene, and by two identical washers 50 arranged one on each side of the annulus 48 and made, like washer 38, of elastomer. These three components have the same internal and external contours of the washer 38.

The spacer annulus 48, the thickness of which may be as much as 10 mm, has the same series of circular orifices 40 and the same radial ducts 42 as the washer 38.

The washers 50 simply comprise, in addition to the holes 46 for the passage of the bolts, two slots 52 (only one of which can be used) with the same shape as the slots 36 and positioned in such a way as to face them when the cell is assembled.

It can thus be seen that, in this embodiment, the distribution of liquid into the space between the electrodes followed by its collection are provided for by the central annulus 48, the two washers 50 serving solely to allow the liquid to be transported between the cages 14 and the annulus 48.

Figure 4:
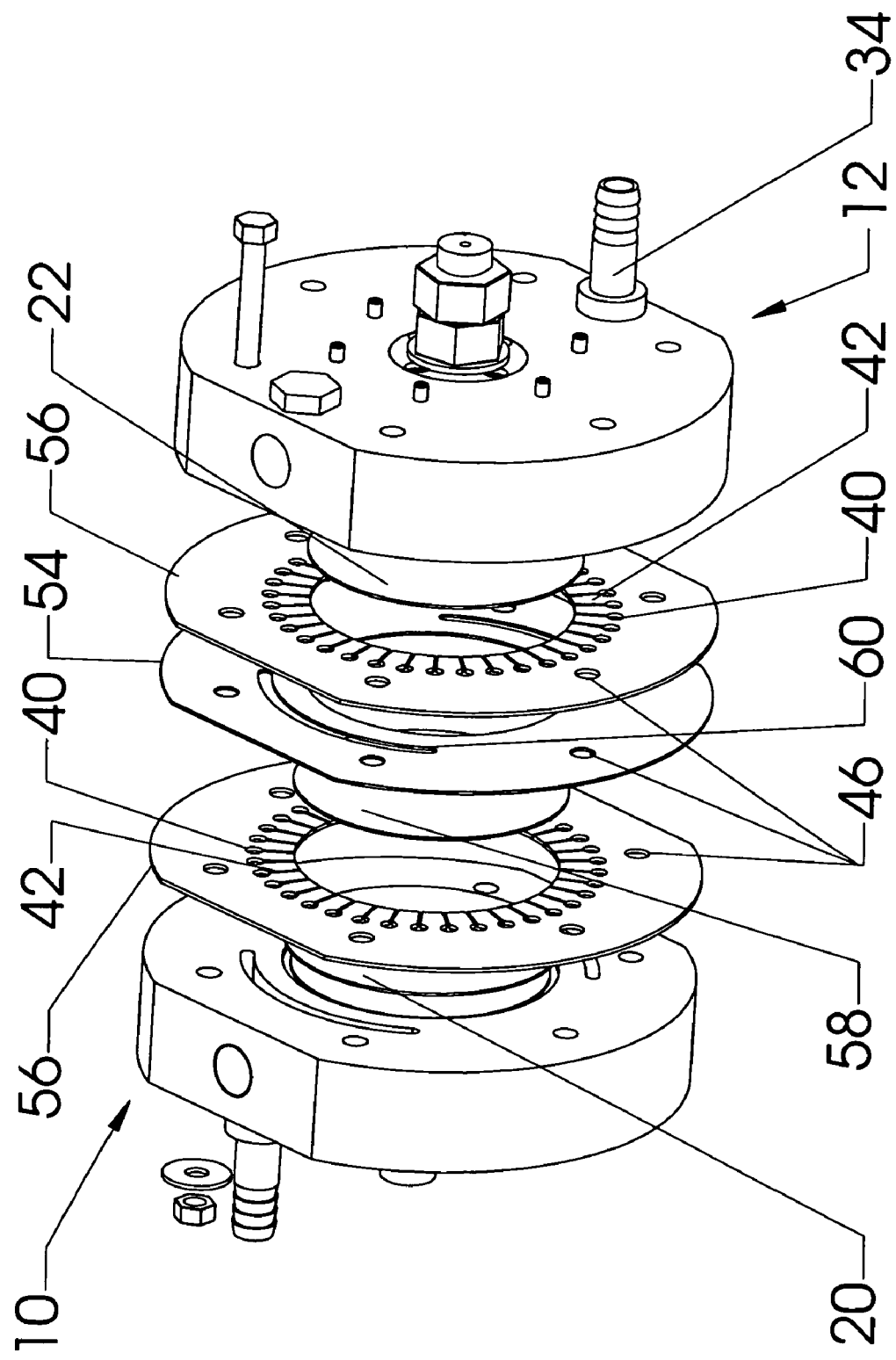
FIG. 4 depicts, in exploded perspective, a third embodiment of a bipolar cell.

The cell described above may also adopt a bipolar structure. In this case, which is the third embodiment of the invention, the supply washer 38 of the first embodiment is replaced, as shown by FIG. 4, by an annulus 54 made of polypropylene and by two identical washers 56 arranged one on each side of the annulus 54 and made of elastomer. These three components have the same external and internal contours as the washer 38.

The inside of the annulus takes an electrode 58, the same thickness and same diameter as electrodes 22. It is formed of a conducting substrate coated on both sides with a layer of doped diamonds to make it electrically conductive. The electrode 58, just like the two electrodes 22, may advantageously be produced according to the teachings of document EP 810147.9.

The annulus 54 comprises, in addition to the holes for the passage of the bolts, two diametrically opposed slots 60 with the same shape as the grooves 36 and positioned such that they face them when the cell is assembled.

The two washers 56 are identical to the washer 38. In this embodiment, it is these which distribute and collect the liquid.

Of course, the bipolar cell of FIG. 4 may have several intermediate electrodes 58 associated with an annulus 54, in order, just as with the cell of FIG. 3, to provide a greater electrode separation. In this case, additional washers 56 are inserted between the various annuli 54.

Figure 5:
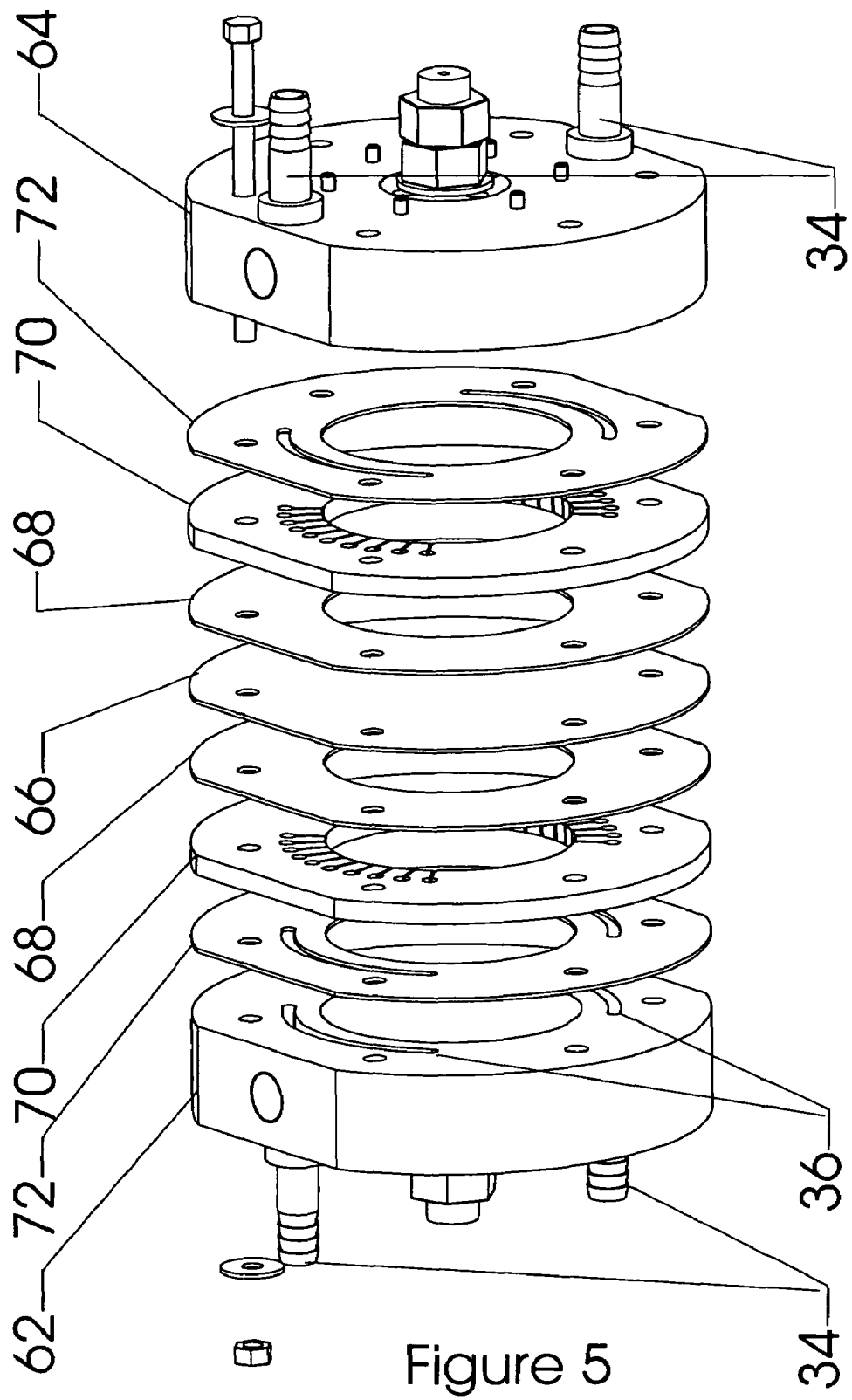
FIG. 5 depicts, in exploded perspective, a fourth embodiment of a membrane cell.

According to a fourth embodiment of the invention, depicted in FIG. 5, the assemblies 10 and 12 of FIG. 1 are replaced by assemblies 62 and 64 which differ from the former only in that they have two fittings 34 and have to have two diametrically opposed circular grooves 36, the liquid for treatment then being conveyed by one of the fittings and re-emerging via the other. This cell works with two electrolytes which do not mix and which, respectively, according to a known process, form an anolyte stream and a catholyte stream.

In this case, the supply washer 38 of FIG. 1 is replaced by a stack the central element of which is a membrane 66 made of electrically conductive material selectively permeable to certain ions, such as an ion exchange membrane made of Nafion. As an alternative, the membrane 66 may be replaced by a porous diaphragm. On each side of this element there are, arranged symmetrically, two elastomer washers 66 then two polypropylene annuli 70 and finally two further washers 72 made of fluoroelastomer. All these components have the same external contour as the washer 38 and have the six holes 46 for the passage of the assembly bolts. The washers 68 and 72 and the annulus 70 also have the same circular interior contour as the washer 38.

The washers 38 have no other special openings. The annuli 70 are identical to the spacer annulus 48 of FIG. 3, while the washers 72 have the same slots 60 as the annulus 54 in FIG. 4.

It will be noted that, in the embodiment of FIG. 5, the annuli 70 serve only to increase the separation between the electrodes, as is the case of the annulus 48 in FIG. 3. When this cell has to operate on liquids that have a low conductivity, the annuli 70 and the washers 68 and 72 can therefore be omitted and replaced with the washers 38 of FIG. 1.

Figure 6:
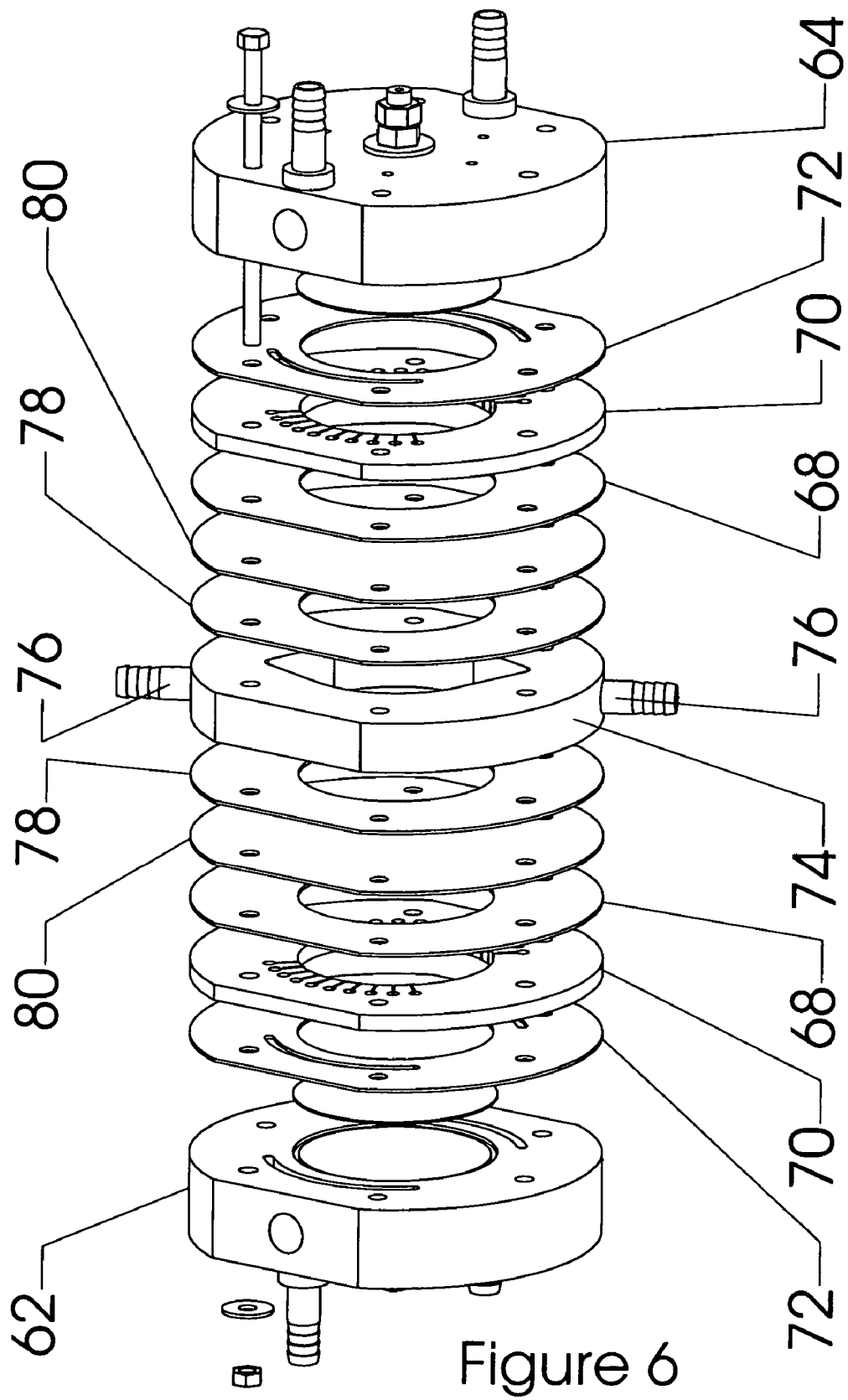
FIG. 6 depicts, in exploded perspective, a fifth embodiment of a cell with two membranes.

Finally, FIG. 6 depicts a fifth embodiment of the cell according to the invention. In this case, the supply washer 38 in FIG. 1 is replaced by a stack of elements having the same external contour as the washer 38 and having the six holes 46 for the passage of the assembly bolts. The central element is a hollow annulus 74 made of polypropylene, fitted with two diametrically opposed fittings 76 intended to be connected respectively to a pipe for conveying and to a pipe for removing liquid.

The cell of FIG. 6 can, according to a known process, operate with three separate streams, namely an anolyte stream and a catholyte stream circulating respectively in the assemblies 62 and 64, and a stream of liquid for processing circulating through the annulus 74.

On each side of this annulus there are, arranged symmetrically, two washers 78 identical to the washers 68 in FIG. 5, then two membranes 80 identical to the membrane 66 in the same figure. The membranes 80 can also be replaced by porous diaphragms. The stack continues, as in the cell of FIG. 5, with two washers 68, two annuli 70 and two washers 72.

When this cell has to operate on liquids with low conductivity it is possible, as with the cell of FIG. 5, to omit the annuli 70 and the washers 68 and 72 and replace them with the washers 38 of FIG. 1.

In all the embodiments which have just been described it may be advantageous to lengthen the path of the fluids between the electrodes, thus improving the efficiency of the electrochemical processes. In order to achieve this effect, various elements of the cell such as, for example, the washer 38 in FIG. 1, can be provided at their centre with a grating 82 whose purpose is to encourage turbulence and to act as a spacer between the electrodes. This grating is advantageously made of an insulating chemically stable material such as polypropylene or polyethylene.

Thus an electrochemical cell whose modular structure, associated with the use of interchangeable elements allows it a wide variety of configurations meeting the various user requirements have been proposed.

What is claimed is:

1. A modular electrochemical cell, comprising:
   two assemblies each comprising a support structure defining a cylindrical recess and having means for connecting a pipe to the assembly, and a disc-shaped electrode arranged inside said recess, each of said electrodes comprising a conducting substrate and a conducting layer of diamonds deposited on said substrate, and said assemblies being arranged relative to each other so that their respective electrodes face each other;
   insert means inserted between said assemblies for defining an open space between the electrodes, said support structure having passage means for conveying a fluid between said pipe connecting means and said open space; and,
   securing means for securing together said assemblies and said insert means.

2. A cell according to claim 1, wherein each of said electrodes is fixed on a conducting support disc that can be connected to a power source, and wherein each of said assemblies further comprises means for adjusting from outside said support structure an axial position of said support disc inside said recess so that an outer face of the electrode can be moved to lie flush with an inner surface of said support structure adjacent to said recess.

3. A cell according to claim 2, wherein said recess contains a ring surrounding the support disc and a seal between the support disc and a wall of the recess, and wherein the axial position of said ring is adjustable from said outside said structure so as to compress said seal between the electrode and said ring.

4. A cell according to claim 1, wherein the passage means of each support structure has an opening which opens towards the inside of said connected assemblies via a groove in the shape of an arc of a circle, and wherein the support structures of said connected assemblies are arranged in such a way that said grooves are diametrically opposed, and the opening of one support structure serves to convey fluid to said space and the opening of the other support structure serves to remove fluid from said space.

5. A cell according to claim 4, wherein said insert means comprises an insulating washer pierced with orifices positioned to communicate with said grooves, each of these orifices also communicating with an internal portion of the washer via a radial duct.

6. A cell according to claim 4, wherein said insert means comprises:
   an insulating flat spacer annulus pierced with orifices position to communicate with said grooves, each of these orifices also communicating with an internal portion of the annulus via a radial duct, and
   two insulating washers arranged one on each side of the spacer annulus and each pierced with a slot in the shape of an arc of a circle and positioned to communicate with a corresponding one of the grooves.

7. A cell according to claim 4, wherein said insert means comprises:
   an insulating flat annulus pierced with two slots each in the shape of an arc of a circle and positioned to communicate with said grooves,
   a disc-shaped bipolar electrode arranged inside said annulus, and
   two insulating washers arranged one on each side of the annulus and each pierced with orifices positioned to communicate with a corresponding one of the grooves, the orifices of each of these washers also communicating with an internal portion of the washer via a radial duct.

8. A cell according to claim 1, wherein the passage means of each support structure has two openings which emerge inwards of said connected assemblies via a pair of two diametrically opposed grooves each in the form of an arc of a circle, said support structures being arranged in such a way that their respective pairs of grooves face each other, the openings of one support structure serving to convey a fluid to said open space and the openings of the other support structure serving to remove a fluid from said open space.

9. A cell according to claim 8, wherein said insert means comprises:
   a selectively permeable conducting membrane or a porous diaphragm, and
   two insulating washers arranged one on each side of the membrane or of the diaphragm and each pierced with orifices positioned to communicate with a corresponding pair of said grooves, the orifices of each of these washers also communicating with an internal portion of the washer via a radial duct.

10. A cell according to claim 8, wherein said insert means comprises:
    a central hollow annulus that can be connected to a pipe for conveying a fluid to said hollow annulus and to a pipe for removing a fluid from said hollow annulus,
    first and second insulating washers each arranged with one side facing a corresponding side of the annulus,
    two selectively permeable conducting membranes or two porous diaphragms each arranged respectively with one side facing the other side of the first and second washers, and
    third and fourth insulating washers each arranged respectively on the other side of the two membranes or diaphragms and pierced with orifices positioned to communicate with a corresponding pair of said grooves, the orifices of each of these third and fourth washers also communicating with an internal portion of the washer via a radial duct.

11. A cell according to claim 1, wherein said insert means comprises a plurality of interchangeable modular elements differing from one another by having different means for communicating a fluid between sail open space and the passage means of at least one of said support structures.

12. A cell according to claim 11, wherein one or more of said modular elements is an insulating washer pierced with orifices positioned to communicate with the passage means of at least one of said support structures, said orifices also communicating with an internal portion of the washer via a radial duct.

13. A cell according to claim 11, wherein one or more of said modular elements is an insulating flat spacer annulus pierced with orifices position to communicate with the passage means of at least one of said support structures, said orifices also communicating with an internal portion of the annulus via a radial duct.

14. A cell according to claim 11, wherein one or more of said modular elements is an insulating washer pierced with a slot in the shape of an arc of a circle and positioned to communicate with the passage means of at least one of said support structures.

15. A cell according to claim 11, wherein one or more of said modular elements is an insulating flat annulus pierced with two slots each in the shape of an arc of a circle and positioned to communicate with the passage means of at least one of said support structures.

16. A cell according to claim 11, wherein one or more of said modular elements is an insulating flat annulus pierced with two slots each in the shape of an arc of a circle and positioned to communicate with the passage means of at least one of said support structures.

17. A cell according to claim 11, wherein one or more of said modular elements is a selectively permeable conducting membrane or a porous diaphragm.

18. A cell according to claim 1, wherein each of said electrodes comprises a solid substrate coated with an electrically conductive coating.

19. A cell according to claim 1, wherein said fluid is a liquid.

20. A cell according to claim 1, wherein said insert means distributes a fluid to a plurality of openings spaced from each other along an edge of said open space.

* * * * *